Oct. 24, 1950     G. W. HOLLANDSWORTH     2,526,750
FORCE PLUNGER
Filed Nov. 29, 1946     2 Sheets-Sheet 1
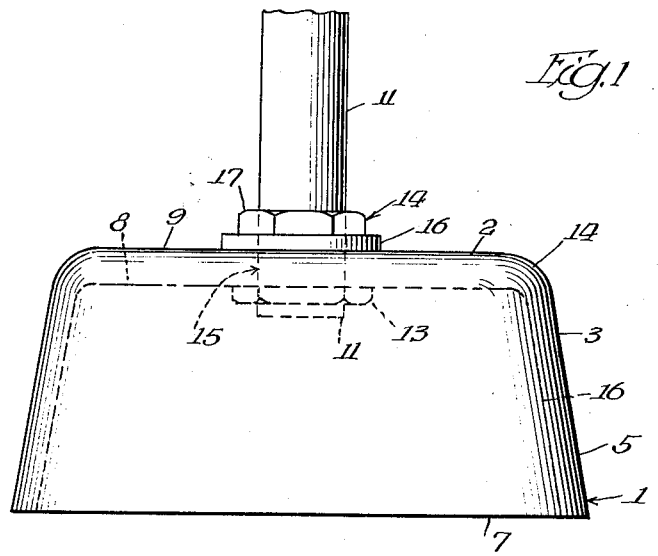
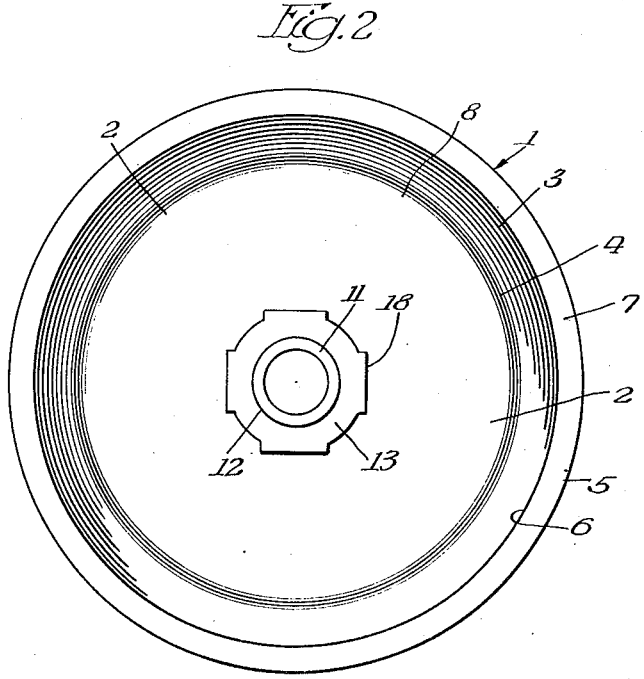
Inventor
George W. Hollandsworth
By: Spencer, Margall, Johnston & Cook,
Attys Oct. 24, 1950 G. W. HOLLANDSWORTH 2,526,750
FORCE PLUNGER Filed Nov. 29, 1946 2 Sheets-Sheet 2

Inventor
George W. Hollandsworth
By Spencer, Hargall, Johnston + Cook
attys

Patented Oct. 24, 1950

2,526,750

UNITED STATES PATENT OFFICE 2,526,750

FORCE PLUNGER

George W. Hollandsworth, Knox, Ind.

Application November 29, 1946, Serial No. 712,873

1 Claim. (Cl. 4—255)

This invention relates to force plungers for forcing obstructions through, from and out of pipes, traps of plumbing fixtures and the like.

The primary object of the present invention is the provision of an improved plunger made of rubber or rubber-like material, the plunger comprising a body constructed and arranged of a particular shape, size and thickness so as to create the proper force to dislodge obstructions in pipes, traps and plumbing fixtures, and whereby the plunger will not slip or shift when in contact with a wet, slippery surface such as the trap of a water closet bowl.

Another important object of the invention is the provision of a rubber or rubber-like plunger which may be readily and economically made, which is durable and efficient in operation and which definitely and positively creates a force considerably greater than conventional plungers for similar purposes, and will not slip easily when used in connection with a slippery, wet surface such as the trap of a water closet bowl.

A still further object of the invention resides in the provision of a rubber plunger cup characterized in its particular construction and having improved means for securing the novel plunger to a hollow pipe line so that water may be forced through the pipe line to flush away obstructions in the pipe when dislodged by the plunger of the present invention.

The accompanying drawings illustrate a selected embodiment of the invention, and the views therein are as follows:

Fig. 1 is a detail elevational view of the improved force plunger;

Fig. 2 is a detail bottom plan view;

The particular plunger herein shown for the purpose of illustrating the invention comprises a flexible rubber or rubber-like body 1 comprising a relatively circular top 2 of a predetermined thickness. An annular, conical skirt 3 is integrally connected to the top 2 and depends inclininingly downward therefrom. The top surface is relatively straight and flat and is mounted at 4 where the skirt 3 connects integrally with the top 2.

Figure 3:
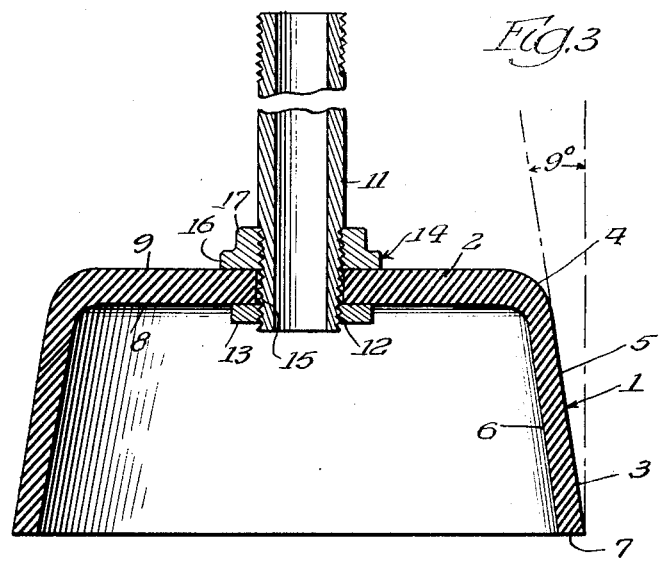
Fig. 3 is a transverse sectional view through the improved plunger.
Figure 4:
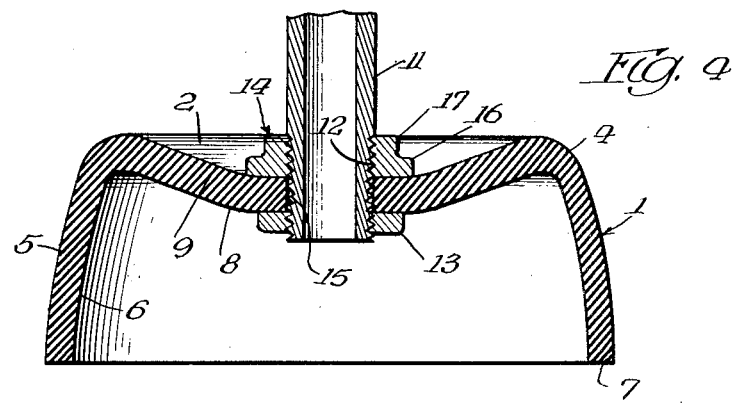
Fig. 4 is a view similar to Fig. 3, but showing the plunger in its partly flexed position during operation.
Figure 5:
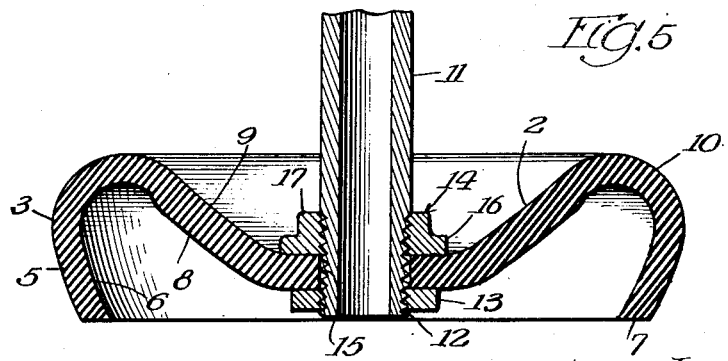
Fig. 5 is a view similar to Figs. 3 and 4, but showing the suction cup deflected to its full capacity.

The annular skirt includes parallel side walls, defining the outer wall 5 and the inner wall 6. These surfaces are relatively flat and straight and incline at substantially an angle of 9 degrees from the vertical, as clearly shown in Fig. 3. The bottom peripheral edge 7 of the skirt is straight and flat, and is parallel with the inner and outer surfaces 8 and 9 respectively of the top 2, making an angle of approximately 81 degrees with the conical skirt. The inner diameter of the body at the bottom peripheral edge of the skirt has an inside dimension of 4 inches, while the height, as measured along the inclined inside side wall 6, is substantially 1½ inches. The inside diameter of the top, as measured horizontally along the inner surface 8, is approximately 3⅜ inches. In actual practice, it has been found that a device embodying substantially the above measurements, with the skirt depending from the top at substantially the degree mentioned, and approximately ³⁄₁₆ of an inch thick provides a device which is highly efficient in operation. The outer surface of the body 1 where the skirt 3 joins the top is relatively rounded on the outside thereof and has a relatively sharp angle on the inside juncture. The top, which may be substantially the same thickness as the side wall of the skirt but which may be slightly thicker, permits the proper flexing of the body during operation, and when flexed during operation will cause a bowing effect, as shown in Fig. 4. Complete deflection of the body, as shown in Fig. 5, provides a considerable force but causes the lower peripheral edge 7 to remain in substantially the same position, the bowing operation being effected substantially at the juncture of the top with the side wall skirt as indicated at 10 in Fig. 5. The straight flat bottom edge will be maintained in its normal position during operation even when completely flexed to obtain the maximum force, and the peripheral edge 7 will hug the surface tile and will not slip even though the device is used on a wet, slippery surface such as the trap or outlet of a water closet, sink or the like. It is, therefore, desirable that the body 1 be made in the shape, size, construction and thickness as indicated in this specification. Also, a device made in the proportions and sizes herein indicated makes the device applicable for universal service in that its particular size is useful for practically every application for which the structure is intended.

The body 1 may have secured thereto a rigid operating handle 11 which is preferably made in the form of a hollow metal pipe so that a piece of flexible hose may be attached to the end of the handle and applied to a source of water supply under pressure to assist in dislodging any obstruction in the line to be cleaned. It may be desirable to have a closure valve (not shown) somewhere in the line between the body 1 and the water supply leading thereto so that the device may be used without water flowing therethrough, and when used for this latter purpose will prevent fluid or sewage in the trap or drain from passing up through the pipe.

The lower end of the pipe 11 is threaded as indicated at 12 and extends a predetermined distance below the inside 8 of the body 1. A lock nut 13 threadedly engages the screw threads 12, and a lock nut 14 also threadedly engages the threaded part 12 so that when the lock nuts 13 and 14 are screwed together they will impinge the surface 2 about the central opening 15 through which the pipe extends. The lock nut 14 is wider across its base 16 and is preferably circular. The upper part 17 of the lock nut 14 is hexagonal or octagonal so that it may be screwed into position by a wrench. The inner lock nut 13 is also properly configurated, with straight sides 18, Fig. 2, so that a proper wrench can be applied thereto for positioning the same.

A force plunger constructed in accordance with the present invention and paying particular stress to the side wall formation, particularly with its straight bottom edge 7 which is parallel to the top 2, and without any flange, provides for a highly efficient device which operates very successfully and which will not slip or shift during use even though used on a relatively slippery surface such as the opening in a water closet bowl, sink or other fixture.

Changes may be made in the form, construction and arrangement of the parts without departing from the spirit of the invention or sacrificing any of its advantages, and the right is hereby reserved to make all such changes as fall fairly within the scope of the following claim.

The invention is hereby claimed as follows:

A force plunger comprising a flexible rubber or rubber-like body having a flat circular top of uniform thickness with a small concentric opening therein, an annular skirt of uniform thickness integral with said top depending outwardly and downwardly from said top as a conical configuration, said skirt terminating in a planar sealing surface parallel to said top and making an angle of approximately 81 degrees with said skirt, and said skirt being of less thickness than said top and having a length less than the diameter thereof, the ratio of said length to said diameter being approximately 1 to 2, and the outer surface of the body where the skirt joins the top being relatively rounded on the outside and forming a relatively sharp angle on the inside thereof; a rigid elongated operating handle extending through said opening perpendicularly to said top; and means clamping said handle to the central portion only of said top, whereby upon advancing movement of the operating handle the body bows outwardly at the juncture with the skirt and the sealing surface remains in substantially the same position relative to an engaged surface.

GEORGE W. HOLLANDSWORTH.

REFERENCES CITED

The following references are of record in the file of this patent:

UNITED STATES PATENTS

| Number | Name | Date |
|---|---|---|
| 220,330 | Armstead | Oct. 7, 1879 |
| 958,841 | Smith et al. | May 24, 1910 |
| 1,178,147 | Gardner | Apr. 4, 1916 |
| 1,193,476 | Block | Aug. 1, 1916 |
| 2,001,230 | Wayne | May 14, 1935 |
| 2,267,064 | Wikelund | Dec. 23, 1941 |